June 6, 1939.  H. D. L. NILSSON  2,161,551

INSTRUMENT FOR DRAWING SCALES

Filed Sept. 3, 1937

INVENTOR.
BY
ATTORNEY.

Patented June 6, 1939

2,161,551

UNITED STATES PATENT OFFICE 2,161,551

INSTRUMENT FOR DRAWING SCALES

Håkan David Leonard Nilsson, Stockholm, Sweden

Application September 3, 1937, Serial No. 162,386
In Sweden September 3, 1936

7 Claims. (Cl. 33—38)

My invention relates to drawing instruments and particularly to an improved instrument for rapidly marking a scale on a drawing, plan, map and the like.

In certain kinds of drawings, as architectural drawings, mechanical drawings, land-surveying maps and so forth every drawing requires a scale, exactly giving the particular sizes. In practice, the work in drawing the scale is very often repeated, that is, once for each drawing, and further that it is very tedious. Therefore, it is of great importance to the draftsman to have means for facilitating this work. The present invention refers to such an instrument.

The instrument according to the invention is provided with a handle and a roller in connection therewith, so arranged that it rolls along a line on which the scale is to be marked, setting off along the line the divisions of the scale which are desired. According to the degree of precision required for the scale, different methods of marking scale divisions can be used. The greatest precision is obtained if the roller is provided with very small and sharp points, which just penetrate the paper, leaving small but plain perforations. By means of said perforations the experienced draftsman can later on without difficulty draw the scale.

In cases where the demand for precision is less, a simplification of the drawing of the scale may be obtained by employing a type roller for marking the scale divisions. According to one further object of this invention, the stamp pad is impregnated with some light colouring medium, known per se, which is hygroscopic for india ink, so that a light touch with the pen on a coloured surface causes the ink to float out and fill all the surface with sharp and even outlines.

Of course the rollers, which mark the divisions of the scale, should be changeable in order that the instrument can be used for marking different scales. Besides the division roller for the scale, a figure printing roller may be provided, which roller automatically prints numerals at the division points.

Further objects and advantages of my invention will be apparent from the following description, considered in connection with the accompanying drawing, which forms a part of this specification and of which:

Figure 2:
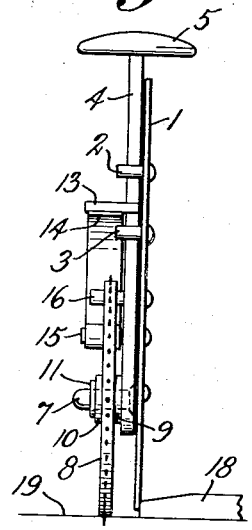
Fig. 2 is an end view of the device shown in Fig. 1.

On the frame or plate 1 two pairs of studs 2 and 3 are provided on either side of a rod 4, which is longitudinally displaceable within the studs. The rod 4 is provided with a knob 5 at its upper end with an enlargement 6 at its lower end in a plane parallel to the plate. In the centre of the enlarged part 6 there is provided a pin 7 on which the roller 8 is rotatably mounted, preferably between washers 9 and 10. The roller 8 and the washers 9 and 10 are held in position on the bolt 7 by means of a spring 11, pivotally connected at its other end to a pin 12 mounted on the plate 1, whereby the spring can follow the movements of rod 4. A shoulder 13 is provided on the rod 4 and disposed between studs 2 and 3. A spring 14, which is secured at one end to a pin 15 mounted on plate 1, bears against a pin 16 and contacts shoulder 13 and tends to hold the shoulder up against studs 2. In this position of the shoulder 13 and rod 4, the roller 8 is in an inactive position above the lower edge 17 of the plate 1 and entirely within the boundaries of the plate, so that the points on the roller can not be destroyed. When the instrument is to be used, the edge 17 is placed against the edge of a square or other instrument, in Fig. 2 schematically shown at 18. The plate 1 is preferably grasped between the thumb and the middle finger of the right hand and the knob 5 is depressed by the forefinger of the right hand, so that the rod 4 is displaced within the studs 2 and 3 against the action of flat spring 14, spring 11 turning at the same time around the pin 12. The points of the roller 8 are thus brought into contact with the paper, in Fig. 2 schematically shown as 19. When moving the instrument along the edge of square 18, the roller 8 rolls on the paper and the points perforate the paper, thereby marking the points on the scale.

Figure 3:
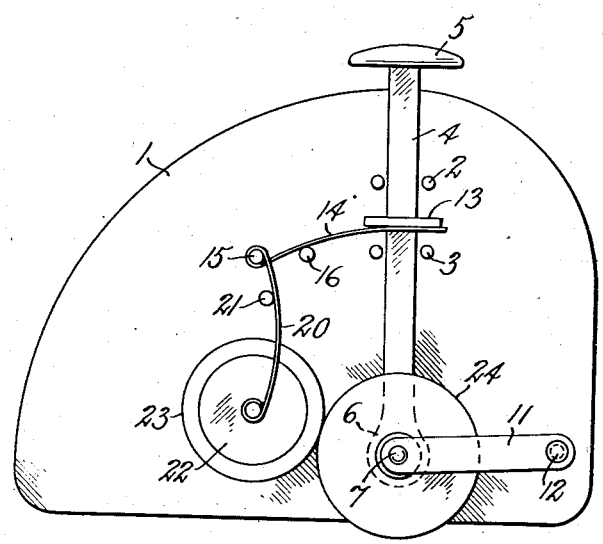
Fig. 3 is a side view of another embodiment of my invention.

Fig. 3 shows the corresponding arrangement, applied for printing by means of stamp ink. The device according to Fig. 3 differs from that according to Fig. 1 in that the spring 14 is continued in the form of another branch 20, resting against a pin 21, which supports an inking roller 22, covered by a suitable stamp pad 23. The stamp pad 23 touches a roller 24, preferably provided with rubber type, which roller replaces the roller 8 in the device according to Figs. 1 and 2.

Figure 1:
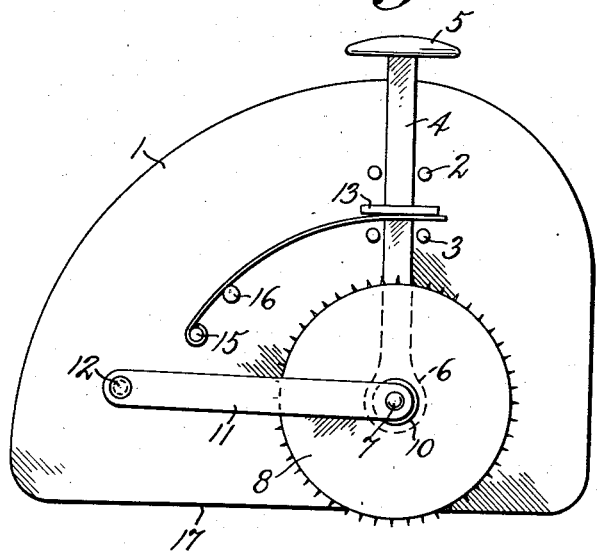
Fig. 1 is a side view of one embodiment of my invention.

In either of the embodiments shown in Figs. 1 and 3, the roller 8 or 24, respectively, may be removed from the pin 7 by springing the resilient member 11 sufficiently to disengage it from pin 7 and then pivoting it about pin 12 until it is beyond the periphery of the roller. Thereupon, the roller may be slid off the pin 7.

Obviously, many modifications can be made in the arrangement described. Thus the device according to Figs. 1 and 2 with a pointed roller for marking the scale divisions may be used with a stamp roller at the side of the pointed roller, so that not only perforations but also the desired marking of the figures may be obtained. According to another form of the invention, the same instrument is so arranged that alternatively stamp rollers and pointed rollers may be placed in the instrument.

What I claim is:

1. An instrument for marking scales adapted to be moved over a surface, a plate member, a rotatable roller movably secured to said plate, means on said roller for marking a scale on said surface, means for moving said roller relative to said plate to an inactive position entirely within the boundaries of said plate, and means for moving said roller against the action of the last mentioned means to a position in which the roller is partially outside the lower boundary of said plate.

2. An instrument for marking scales adapted to be moved over a surface, a plate member, a rod slidably mounted on said plate, a roller rotatably mounted on said rod, means on said roller for marking a scale on said surface, and means for moving said rod and roller relative to said plate to an inactive position in which said roller is entirely within the boundaries of the plate, said rod extending above said plate whereby the rod is movable manually against the action of the last mentioned means to a position in which said roller is partially outside the lower boundary of said plate.

3. An instrument for marking scales adapted to be moved over a surface, a plate member, a pin movably secured to said plate, a roller removably and rotatably mounted on said pin, a resilient member connected to said plate and engaging said roller for yieldably resisting removal of the roller from said pin, means on said roller for marking a scale on said surface, means for moving said roller relative to said plate to an inoperative position wholly above the lower edge of the plate, and means for moving said roller against the action of the last mentioned means to an operative position in which the roller projects below the lower edge of said plate.

4. An instrument for marking scales adapted to be moved over a surface, a plate member, a rotatable roller movably secured to said plate, a plurality of pointed members extending radially from said roller for marking a scale on said surface, means for moving said roller relative to said plate to a protected position entirely within the boundaries of the plate, and means for moving said roller against the resistance of the last mentioned means to an operative position, in which the roller is partially beyond the lower boundary of said plate.

5. An instrument for marking scales adapted to be moved over a surface, a plate member, a pin movably secured to said plate, a roller removably and rotatably mounted on said pin, a resilient member connected to said plate and engaging said roller for yieldably resisting removal of the roller from said pin, a plurality of sharply pointed members extending radially from said roller for marking a scale on said surface, means for moving said roller to an inactive position wholly within the boundaries of said plate, and means for displacing said roller against the force exerted by the last mentioned means to a position in which said pointed members project beyond the lower boundary of said plate.

6. An instrument for marking scales adapted to be moved over a surface, a plate member, a rotatable type roller movably secured to said plate, a rotatable inking roller movably secured to said plate, means for maintaining said rollers in contact with each other, means for moving said type roller relative to said plate to an inoperative position entirely within the boundaries of said plate, and means for moving the said type roller against the action of the last mentioned means to a position in which the type roller is partially outside the lower boundary of said plate.

7. An instrument for marking scales adapted to be moved over a surface, a plate member, a pin movably secured to said plate, a type roller removably and rotatably mounted on said pin, a resilient member connected to said plate and engaging said type roller for yieldably resisting removal of the type roller from said pin, a rotatable inking roller movably secured to said plate, means for urging said inking roller into contact with said type roller, means for moving said type roller relative to said plate to an inoperative position entirely within the boundaries of said plate, and means for moving said type roller against the action of the last mentioned means to a position in which the type roller is partially outside the lower boundary of said plate.

HÅKAN DAVID LEONARD NILSSON.